UNITED STATES PATENT OFFICE.

PIERRE DUTOIT, OF MONTHEY, SWITZERLAND, ASSIGNOR TO SOCIETY OF CHEMICAL INDUSTRY IN BASLE, OF BASEL, SWITZERLAND.

PROCESS FOR THE MANUFACTURE OF BETAAMINOANTHRAQUINONE.

1,255,719.

Specification of Letters Patent.

Patented Feb. 5, 1918.

No Drawing. Application filed April 26, 1917. Serial No. 164,794.

*To all whom it may concern:*

Be it known that I, PIERRE DUTOIT, chemist, a citizen of the Swiss Republic, and resident of Monthey, Switzerland, have invented a new and useful Process for the Manufacture of Betaaminoanthraquinone.

I have found that the technically valuable betaaminoanthraquinone can be obtained easily by heating the betaanthraquinonemonosulfonic acid with ammonia or a liquid containing ammonia and with an aromatic nitrocompound as, for instance, a nitrohydrocarbon or one of its derivatives. Hereby is obtained, besides the betaaminoanthraquinone, as valuable secondary product the aromatic aminocompound corresponding to the nitrocompound employed.

The invention is illustrated by the following examples:

Example I: In an autoclave are heated 500 gr. of sodium betaanthraquinonesulfonate with 1000 ccm. of water, 1500 ccm. of ammonia of 26 per cent. and 240 gr. of nitrobenzene, for 24 hours at 190 to 200° C. After cooling the content of the autoclave is distilled with steam and betaaminoanthraquinone remaining in form of crystals is separated by filtration, washed with water and dried. Thus are obtained 290 to 300 gr. of betaaminoanthraquinone corresponding to an output of 81 to 84 per cent. of the theory. By adding common salt to the motherlye small quantities of unchanged sodium betaanthraquinonesulfonate can be separated therefrom. From the liquid distilled off by the treatment with steam can be obtained about 90 gr. unchanged nitrobenzene and about 90–100 gr. anilin corresponding to the quantity of nitrobenzene consumed.

Example II: For the 240 gr. of nitrobenzene employed in Example I are substituted 440 gr. of sodium nitrobenzenesulfonate. After cooling the content of the autoclave is filtered off and the betaaminoanthraquinone thus obtained in crystalline form is thoroughly washed with water and dried. From the filtered liquid can be separated besides unchanged nitrobenzenesulfonic acid the quantity of anilinsulfonic acid corresponding to the sodium nitrobenzenesulfonate consumed.

Instead of those indicated in the examples, other aromatic nitrocompounds, as for instance, nitrotoluene, dinitrobenzene, mononitronaphthalene, dinitronaphthalenes or their sulfoderivatives, etc., can be employed.

The proportions, temperatures, etc., given in the examples can also be varied within wide limits.

What I claim is:

The herein described process for the manufacture of betaaminoanthraquinone and the simultaneous obtainment of an aromatic amino-compound consisting in heating betaanthraquinonemonosulfonic acid with ammonia and with an aromatic nitrocompound.

In witness whereof I have hereunto signed my name this seventh day of April, 1917, in the presence of two subscribing witnesses.

PIERRE DUTOIT.

Witnesses:
CHARLES DUTOIT,
ALFRED BONZON.